Aug. 6, 1963

R. E. HERBERT 3,100,242

MULTIPLE LENS FACSIMILE SCANNER

Filed April 25, 1960

INVENTOR:
R. E. Herbert

BY Homer L. Montague
ATTORNEY

Aug. 6, 1963
R. E. HERBERT
3,100,242
MULTIPLE LENS FACSIMILE SCANNER
Filed April 25, 1960
2 Sheets-Sheet 2
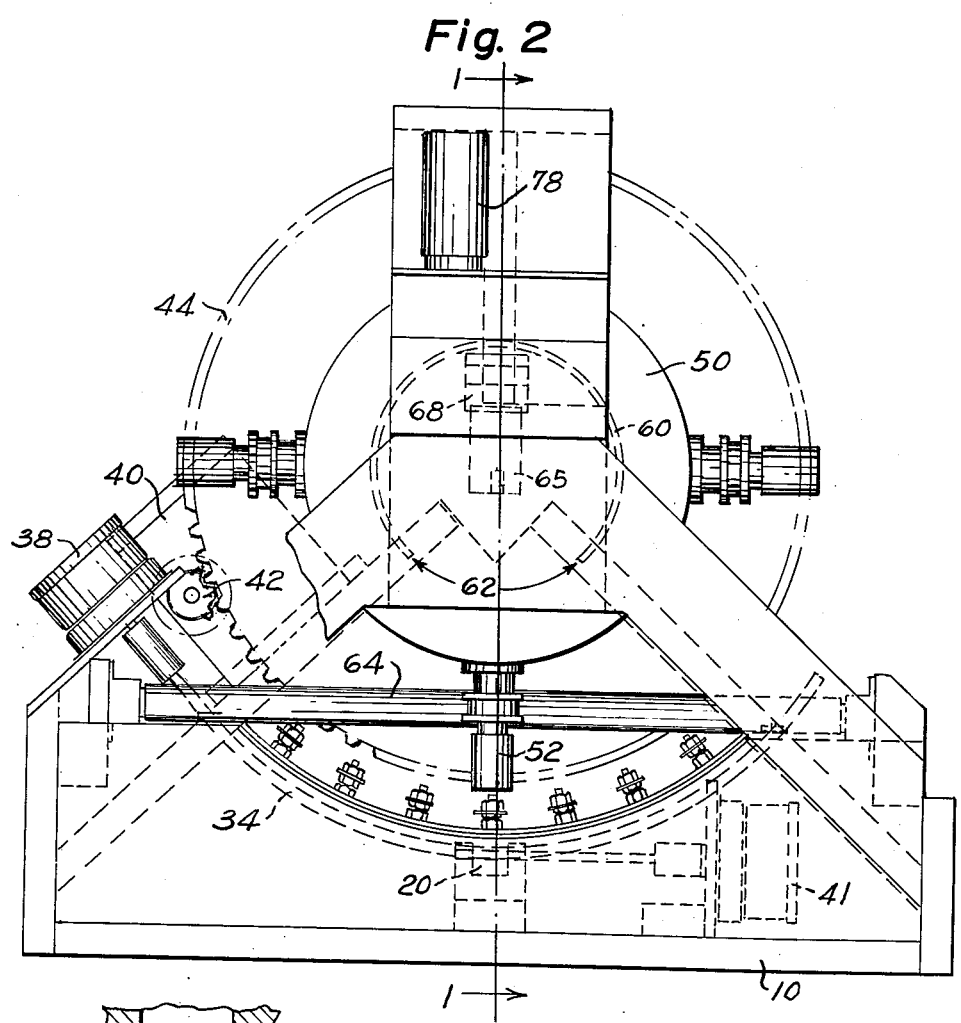
INVENTOR:
R. E. Herbert
BY Homer R. Montague
ATTORNEY

United States Patent Office 3,100,242
Patented Aug. 6, 1963

3,100,242
MULTIPLE LENS FACSIMILE SCANNER
Roland E. Herbert, Westlake, Ohio, assignor to Newspaper Enterprise Association Inc., a corporation of Delaware
Filed Apr. 25, 1960, Ser. No. 24,480
4 Claims. (Cl. 178—7.1)

This invention pertains to copy scanners for facsimile transmission apparatus, and particularly to scanners of the type which employ several angularly spaced scanning lens systems arranged with their axes radiating from a common rotational center, to scan in turn across successive elements of a copy sheet or "original" which is transversely bowed about the same center.

Multiple lens scanners of the type described have been proposed by prior workers in this art, but in all such proposals the problem of establishing uniform optical efficiency for all positions of the scan system (as its lenses travel across the copy elements) has either involved serious mechanical and optical complications, or has gone largely unsolved.

It is accordingly a principal object of the invention to provide a scanner of the above type in which a simplified optical and mechanical scan arrangement cooperates with a simplified copy-illuminating system to provide substantially uniform light pick-up efficiency at all positions of each of the multiple scanning lens systems as they pass in turn across the copy elements.

A further object of the invention is to provide a system as above in which a plurality of radially spaced pick-up or scanner lens tubes cooperate in turn with a single fixed aperture-defining means, from which the scan-produced rays of all the lens tubes in turn can be collected by common optics for re-direction to a single photoelectric sensing device also common to all of the plural lens tubes.

Still another object of the invention is to provide a system and apparatus as above in which provision is made for optically cancelling-out or averaging together those cyclic or sporadic changes in system efficiency which arise from wandering or jittering of the light beams from the multiple scanner tubes or heads; whereby the photoelectric sensing device will produce a constant output signal when uniform copy is scanned, and whereby the output signal will faithfully represent those changes in copy density or reflectivity which correspond to tone values in the copy material.

Yet another object of the invention is to provide a simplified and otherwise improved feeding system for progressing the copy being scanned along its cylindrically-bowed path in timed relation to the scanning motions of the optical components.

Briefly, the arrangement of the invention accomplishes its aims by providing a set of several scan lens tubes or the like mounted in fixed radial positions relative to one another upon a single rotary head member so as to scan in turn across the bowed copy element, said lens tubes being positioned to direct their output beams in turn towards a single aperture-stop defining element which is fixed at or adjacent to the rotation axis of the scan tubes. A common light-collecting system lies just beyond the aperture stop to collect rays passing through the latter, and to direct them onto a preferably diffusing surface which may be formed as part of a reflecting element functioning to forward the collected light flux (no longer consisting of punctual rays) to a single output-signal producing device such as a photocell.

The copy element being scanned is bowed in an arc centered on the rotation axis of the scanner tube assembly, but is illuminated by a simple linear light source (such as a tubular lamp) which spans the arc subtended by the copy element, so that not only does the source-to-object distance across each scan line vary (producing an inverse-square law intensity variation in the light flux incident on the copy element), but so also does the variation in predominate incidence angle of the illumination on the copy produce a cosine-law variation in the flux directed into the scanner optics. These two sources of variation in optical or light-transmitting efficiency are completely compensated by the fixed aperture stop described, by virtue of the variation in its geometric projection as viewed from the changing direction in which each scanner tube or head forwards the rays during its active participation in the scanning process. Moreover, slight output signal variations due solely to wander of a punctual scan-spot image, over regions of different photoelectric sensitivity of the signal converting cell or photomultiplier, are eliminated by the diffusing means included between such device and the aperture stop.

The invention will best be understood from a consideration now of a preferred physical embodiment thereof, given by way of example (and not for purposes of limiting the invention), and illustrated in the accompanying drawings, in which:

FIGURE 2 is a front elevation of the same apparatus, with the casing and other parts omitted and to a somewhat reduced scale; also with certain parts detailed in section.

FIGURE 3 is a schematic diagram illustrating the corrective effect of the fixed aperture stop of the optical system.

Figure 1:
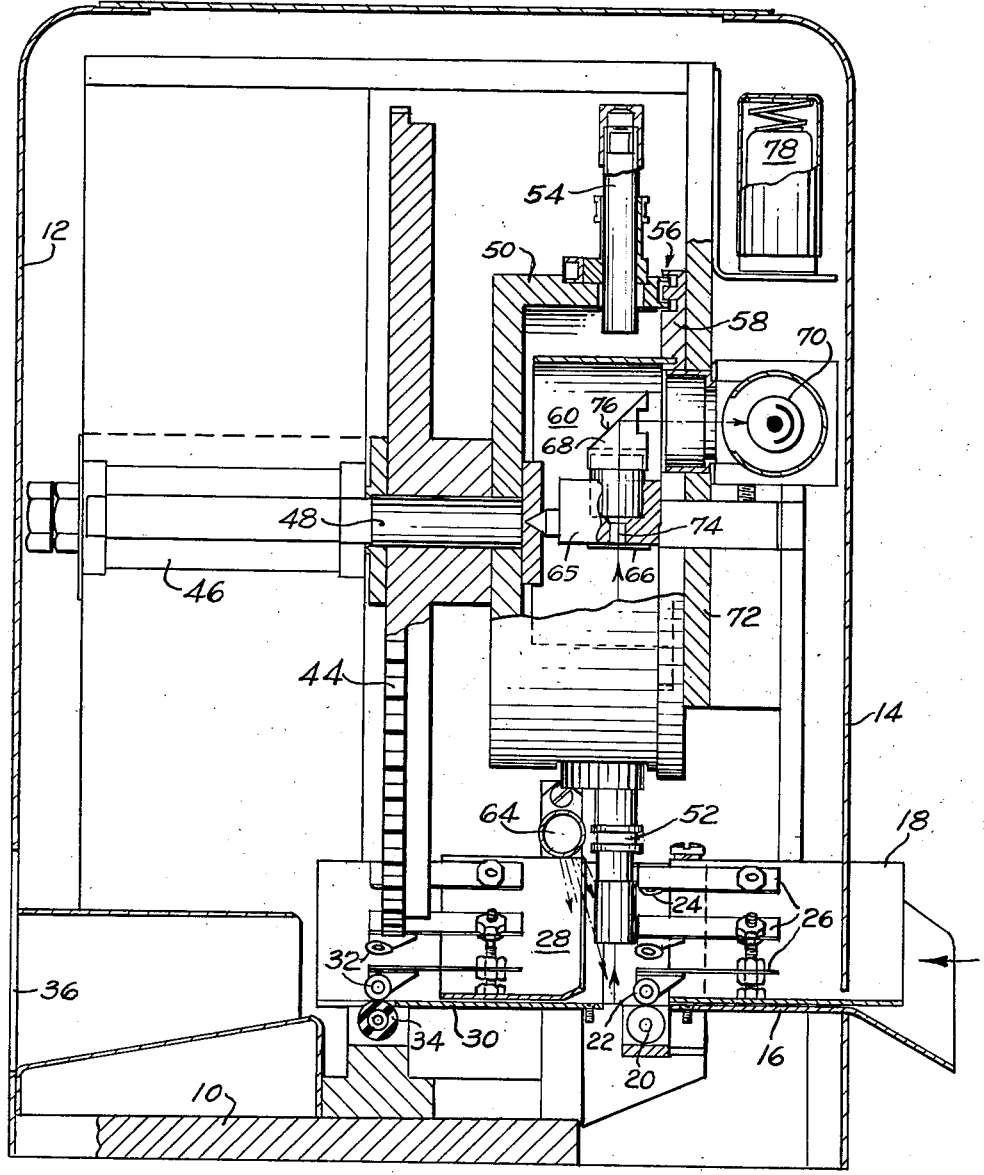
FIGURE 1 is a vertical sectional view of the preferred apparatus, with parts broken away for clarity, the section being taken substantially along the rotation axis of the scanner head; that is, along line 1—1 of FIGURE 2.

Referring first to FIGURE 1 of the drawings, the scanning apparatus includes a suitable main base indicated by numeral 10, and a light-excluding casing 12 whose front wall 14 contains an arcuate entrance window through which extend the outer cylindrically-arcuate support plate 16 for photographs or other original material to be scanned, and an inner cylindrically-arcuate support plate 18 closely adjacent plate 16, the two plates defining an arcuate inlet channel therebetween which causes the material being scanned to assume a cylindrically-bowed configuration. As the original sheet arrives at the scan position, at least the inner support plate 18 has to be interrupted to expose a region for line scan thereof, and as shown in the embodiment being described, both such plates are interrupted and the paper is held between an outer roller 20 and several relatively narrow inner rollers such as 22, 24 individually aligned along the arcuate direction and individually spring-urged against roller 20 as by being mounted on leaf springs 26. Beyond the scan exposure region, the inner and outer support plates are continued as at 28 and 30, and again the inner support plate mounts a set of resiliently-biased rollers 32 on the inside of the arc, cooperating with a single long flexible feed or driven roller 34. After complete line-by-line scanning of the original, it is discharged from casing 12 through a window 36.

The cylindrical configuration described is clearly indicated in FIGURE 2, wherein the same numerals have been used for identical parts, and in which numeral 38 has been applied to a drive motor for the flexible curved feed roll 34, while a separate scan drive motor and gear unit is designated by numeral 40, including a pinion 42 meshing with a large gear 44 serving to drive the scanner tubes in a manner to be described. It will be obvious that these two motors could readily be replaced by a single-motor drive and proper relative speed-changing gears, belts or equivalent elements. A third motor 41 shown in FIGURE 2 may be provided to drive roller 20, which may be one of several relatively narrow rollers arranged on the outer arc, respectively opposite the spring-biased rollers 22, 24 etc.

Returning to FIGURE 1 for a description of the scanner and the optical features of the device, numeral 46 indicates a main bearing in which is journalled the main scanner shaft 48 carrying the driven gear 44 to rotate this shaft, and the scanner head shown as a hollow disc or stub cylinder 50 about the rim of which are mounted a plurality, herein four, of individual scan optics tubes such as 52 and 54. As head 50 rotates about the axis defined by shaft 48, and which axis is also the axis of the cylindrically-bowed plates 16 and 18 (and hence of the bowed copy material), the scanner tubes in turn sweep across a transverse element of the copy material, and pick up rays from such element throughout a scan interval defined by that aliquot portion of each revolution during which each tube actually faces the copy surface; herein, a 90-degree sweep as clearly evident in FIGURE 2. During the part of each rotation of the scanner head in which a given scanner tube is not exposed to the copy matter, it is protected from stray light pick-up by the outer casing 12, insofar as concerns ordinary room illumination. However, since the present invention uses a linear copy-illuminating source flooding the scanned area of the copy material, stray from this source and within casing 12 is prevented from entering the common light-collecting system of the scanner tubes; as by an interdigitating light seal 56 between the rotating head 50 and a fixed front closure plate 58. Moreover, and since there is a small chance that the light straying about the casing interior from the copy illuminating lamp might be able to reach the interior of head 50 via those scanner tubes not directed at the copy material, a subsidary light shield 60 is provided, fixed on plate 58 and extending almost the whole axial length of head 50, but open at its downward quadrant (as at 62 in FIGURE 2) to pass light into the scanner tube which is currently directed at the copy material.

The copy-illuminating light source is a linear tube or lamp 64, such as an ordinary fluorescent lamp, extending across the chord of the arcuate scan region as already defined. The tube 64, see FIGURE 2, is carried by end supports or sockets of conventional type from the machine base, and in view of the arc-and-chord relationship of the bowed copy segment and the lamp, it will be apparent that those portions of the transverse copy segment which lie near the ends of the arc will be illuminated much more strongly than those lying near the center of the scan arc. The invention provides a way of compensating for the systematic difference in scanned-area illumination arising from this convenient arrangement, as well as for the systematic difference due to the fact that the most direct illuminating rays strike the copy material at a relatively glancing angle at the ends of the scan angle or arc.

Secured as on front plate 58 of the scanner is a block 65 having a vertical light ray passage formed therein and closed at its bottom by a plate 66 having a window which constitutes aperture stop defining means common to all of the scanner tubes and receiving light rays from them in turn. Each tube, of course, contains lens elements suitably adjusted to pick up rays from a scan spot of well-defined shape and size, and to relay them to common collecting optics such as lenses carried within the opening of block 65. Surmounting the latter is a prism 68 which directs the collected light flux into a common sensor such as a photomultiplier tube schematically indicated at 70, it being understood that plate 58, and a front support plate 72, are suitably apertured for this purpose.

The operation of aperture stop plate 66 will best be understood from the enlarged diagram of FIGURE 3, in which the lens system within block 65 is schematically shown at 74. At each extreme of a line-scan operation of any one of the scanner tubes, the light transmitted therefrom into block 65 is arriving at an angle (herein, a 45 degree angle) to the plane of the plate 66, while at the central position in each such scan the light arrives perpendicular to the plane of the plate. Hence, the cross-sectional area of the extreme bundles of rays is limited by the aforeshortening of the effective diameter of the stop opening in plate 66, while the central ray bundle is transmitted through the full stop area, and automatic compensation is achieved for the source of copy-illumination variation and for the incidence angle of such illumination on the copy material surface. It will be recognized by those familiar with optics that while a physical aperture plate 66 has been described for clarity, the stop can equally well be defined by the entrance pupil of the optics 74, or by other suitable characteristics of the system.

Slight imperfections in the theoretically perfect alignment of the copy material surface, scanner tubes and other parts of the apparatus can produce a wandering movement of the punctual scanner rays proceeding from aperture stop plate 66 to the cell 70. While this might be throught to do no harm so long as the receiving sensitive surface of the cell is large enough to receive all of the rays forming each bundle, it has been observed that the sensitive (cathode) plate itself may vary in sensitivity from point to point, in which case a periodic error in signal strength will result. This effect is overcome, in accordance with a related feature of the invention, by incorporating a ray diffusing means in the system between the aperture stop and the cell 70, most conveniently by providing prism 68 with a reflecting (hypoteneuse) surface 76 which has been ground or otherwise rendered diffusing in nature. A white or matte diffusely reflecting surface may also be substituted for the usual prism silvering, and the result can also be obtained by incorporating a separate diffusion device in this part of the system. In any event, the result is that local variations in cathode sensitivity are averaged out over the effective illuminated area thereof.

The front support plate 72 may also provide for the mounting of certain electronic parts of the equipment, such as a pre-amplifier for the output signals from multiplier 70, its high-voltage dynode supply system or the like, as suggested at 78. These parts form no essential part of the present invention, and are therefore not shown or described in detail.

While the invention has been described herein as embodied in specific apparatus chosen for purposes of explanation, no limitation is intended to the described details; for the invention itself can be embodied in a variety of different configurations falling within the true spirit thereof as defined in the appended claims.

What is claimed is:

1. A facsimile transmitter scanner comprising means for advancing cylindrically bowed copy in a direction parallel to its cylindrical axis, a rotary scanner head comprising a plurality of scanner tubes mounted at equally spaced radial positions to swing across successive transverse elements of such copy and about said cylindrical axis, a linear light source located adjacent the copy and extending transversely thereof to illuminate a complete transversely-extending region of such copy, means defining a fixed aperture stop located near said cylindrical axis and aligned with the central position of each such tube relative to the scanned elements of the copy during scanning traverses, and a single optical deflecting element disposed fixedly beyond said stop defining means for directing light flux passing through said stop from all of said tubes in succession into a photoelectric sensor.

2. A facsimile transmitter scanner in accordance with claim 1, including beam diffusing means disposed in the path of rays leaving the aperture stop.

3. A facsimile transmitter scanner in accordance with claim 1, in which said optical deflecting element includes at least one diffusing surface.

4. A facsimile transmitter scanner in accordance with claim 1, in which said optical deflecting element is a reflecting prism including a diffusely reflecting surface.

References Cited in the file of this patent

UNITED STATES PATENTS

| | | |
|---|---|---|
| 1,800,000 | Zworykin | Apr. 7, 1931 |
| 2,209,719 | Rustad | July 30, 1940 |
| 2,258,124 | Nichols | Oct. 7, 1941 |
| 2,364,580 | Young | Dec. 5, 1944 |
| 2,413,400 | Young | Dec. 31, 1946 |
| 2,435,250 | Tandler | Feb. 3, 1948 |
| 2,586,711 | Potts | Feb. 19, 1952 |
| 2,888,516 | Nyman | May 26, 1959 |
| 2,894,065 | Wise | July 7, 1959 |

FOREIGN PATENTS

| | | |
|---|---|---|
| 36,755 | France | Apr. 22, 1930 |